United States Patent [19]
Kurdi et al.

[11] Patent Number: 5,932,113
[45] Date of Patent: Aug. 3, 1999

[54] LOW TEMPERATURE ENCAPSULATION SYSTEM

[75] Inventors: Bulent Nihat Kurdi; Dennis R. McKean, both of San Jose; Eric Keith Wong, San Mateo, all of Calif.

[73] Assignee: International Business Machines Corporation, Armonk, N.Y.

[21] Appl. No.: 08/923,360

[22] Filed: Sep. 4, 1997

[51] Int. Cl.⁶ ...................................................... B44C 1/22
[52] U.S. Cl. ................................ 216/22; 216/33; 216/36; 216/41
[58] Field of Search ................................. 216/11, 22, 27, 216/33, 36, 39, 41

[56] References Cited

U.S. PATENT DOCUMENTS

| | | |
|---|---|---|
| 4,564,585 | 1/1986 | Blaske et al. . |
| 4,624,048 | 11/1986 | Hinkel et al. . |
| 5,095,613 | 3/1992 | Hussinger et al. . |
| 5,117,589 | 6/1992 | Bischoff et al. . |
| 5,156,704 | 10/1992 | Kemp . |
| 5,509,554 | 4/1996 | Samuelson et al. . |
| 5,516,430 | 5/1996 | Hussinger . |
| 5,548,886 | 8/1996 | Kojima et al. . |
| 5,613,293 | 3/1997 | Slade et al. . |
| 5,617,273 | 4/1997 | Carr et al. . |

*Primary Examiner*—William Powell
*Attorney, Agent, or Firm*—Robert B. Martin; John J. Gresens

[57] ABSTRACT

A method for preparing the air bearing surface of a slider for etch patterning including the steps of applying a first thin film to a carrier, applying a second thin film to the carrier, the first thin film and the second thin film separated by a recess, each of the first and second thin films having respective first and second air bearing surfaces, applying an adhesive film over the first and second thin films, depositing a fluid in the recess, the fluid held in the recess by the adhesive film, curing the fluid, and removing the adhesive film. The method of the invention may also include coating the first and second air bearing surfaces with an etch mask, developing the etch mask, and patterning the first and second air bearing surfaces.

28 Claims, 8 Drawing Sheets

LOW TEMPERATURE ENCAPSULATION SYSTEM

FIELD OF THE INVENTION

The invention relates generally to preparing thin films for etch patterning. More specifically, the invention relates to preparing transducer laden thin film substrates for etch patterning to form the air bearing surface of a slider. The method of the invention reduces or precludes the redeposition of materials resulting from etching and allows the use of thinner resists providing finer etch patterns due to a more normalized planar geometry.

BACKGROUND OF THE INVENTION

Conventional magnetic disk drives are information storage devices which utilize at least one rotatable magnetic media disk with concentric data tracks, a read/write transducer for reading and writing data on the various tracks or separate read and write tranducers as in the magnetoresistive and giant magnetoresistive heads which have become the trend in the data storage industry as a means of improving data storage density. Disk drives generally also have an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between the transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions that transducers experience during the normal operation of a disk drive can make constancy of fly height anything but a given. If the flying height is not constant, the data transfer between the transducer and the recording medium may be adversely affected.

The manner in which a slider is manufactured and the material the slider is fabricated from can affect fly height. Preferably variations in the physical characteristics of the slider, e.g. due to manufacturing tolerances, should not substantially alter the flying height of the slider. If this result is not achieved, the slider's nominal fly height must be increased to compensate for variations between sliders.

The current process for defining air bearing surfaces uses a dry-film resist as the etch mask. Most current air bearing surface designs are patterned using only a single etch. However, for improved fly height control designs may be patterned using dual etch processes. To process multiple etch designs, an ion milling step and a reactive ion etching step may be used for either of both steps. At certain row spacings the ion milling etch results in redeposited materials being formed on the sides of the rows which cannot be removed. In addition, the etch profiles obtained after ion milling and reactive ion etching steps have shallow wall profiles which make inspection difficult and affect the flying characteristics of the slider.

Exemplary processes used in forming sliders include, Hinkel, et al., U.S. Pat. No. 4,624,048 which discloses a method for making magnetic head sliders using a mask that leaves the area of the substrate surface intended for forming the rails uncovered. Hinkel, et al. uses chemical wet etching to define the recessed regions between respective rails using oxide formed on the surface of the aluminum in the exposed regions as an etch mask.

Carr, et al., U.S. Pat. No. 5,617,273 discloses formation of a thin film slider having a protruding read/write element formed by chemical-mechanical polishing. Carr, et al. uses a lapping slurry to erode the substrate and insulator at a rate which is different than the rate of erosion for the read/write component. The resulting read/write components protrude from the insulator. Slade, et al., U.S. Pat. No. 5,613,293 discloses a method for providing a smooth topographical interface between head and disk surfaces through the use of photoresist etching processes.

Kojima, et al., U.S. Pat. No. 5,548,886 also discloses a method for manufacturing floating magnetic head devices. The process includes forming a resist mask having a predetermined slider surface shape onto a substrate and injection of a solid/gaseous two-phase current of free abrasive grains through an injection nozzle.

Kemp, U.S. Pat. No. 5,516,704 also discloses a method for manufacturing magnetic head air bearing sliders by forming transverse pressure contours on the edges of the slider air bearing surface. Kemp forms these contours by first forming slots in the slider blank adjacent the location where the air bearing surfaces are to be formed. The slots are then filled with an etchable material and the slider blank is machined to form air bearing structures. The etchable material is positioned to form a part of the slide edge of the air bearing structure. The slider blank is then subjected to an etching process that principally etches the etchable material.

Hussinger, U.S. Pat. No. 5,516,430 discloses a planarization procedure which uses an alignment fixture on which the rows are temporarily fixed with pins. A filled thermoplastic material is then placed on the rows with a substrate on top. The substrate is heated to 400–500° F. causing the encapsulant to melt and flow into the gaps between the rows. The heating process is controlled by maintaining the alignment fixture near ambient temperature to avoid encapsulant sticking to the fixture. Sufficient heat is applied to melt the material near the air bearing surface (ABS) which may contain thermally sensitive transducers.

The potential for seepage of material onto the air bearing surface on the slider is a concern using the Hussinger process. The presence of tapers at the leading edge of the slider provide a conduit by which the material can reach the ABS. Contamination of the ABS also causes photoresist imaging and adhesion problems.

Another problem with the Hussinger procedure is the presence of the pins in the alignment fixture. These features will cause holes to exist in the encapsulated carrier. The holes will contribute to yield loss since sliders near holes will be subjected to redeposition during etch steps. Furthermore, the high temperature requirement for this procedure (400–500° F.) may preclude use of certain thermally sensitive transducers such as giant magnetoresistive sensors which are used to produce higher density magnetic storage products.

As a result, there is a continuing need for processes and apparatus which will provide sliders having air-bearing surfaces formed by patterned etching with reduced redeposition of etched particles and finer etch patterns

SUMMARY OF THE INVENTION

In accordance with a first aspect of the invention, there is provided a method of processing a thin film surface to prepare this surface for etching. The thin film surface generally comprises at least one raised portion bordered by at least one adjacent recess. The method includes applying an adhesive film to the raised portion, depositing a fluid into the recess, the fluid held in the recess by the film, curing the fluid, and removing the film.

In accordance with a further aspect of the invention, there is provided a method for preparing the air bearing surface of a slider for etch patterning. The method includes applying a first thin film to a carrier, applying a second thin film to the carrier, the first thin film and the second thin film separated by a recess, each of the first and second thin films comprising respective first and second air bearing surfaces, applying an adhesive film over the first and second thin films, depositing a fluid in the recess, the fluid held in the recess by the adhesive film, curing the fluid, and removing the adhesive film.

One aspect of the invention is a process for air bearing surface patterning which alleviates the redeposition problems and produces etch profiles nearly twice that of standard processes. The processes of the invention involve the use of fluid to fill recesses between rows. The fluid protects the rows against redeposition and planarizes the surface of the rows on the carrier to allow the use of liquid resists. The process is applicable to any air bearing surface (ABS) pattern and can be completed at ambient temperatures.

The problem of poor etch wall profiles is caused by the use of thick dry film resists. The use of these materials also lowers throughput and provides limited resolution and depth control.

In accordance with the invention, etch wall profile problems may be reduced and planarized row carriers can be successfully coated by conventional spin-coating in thicknesses down to 1 micron. We found that the use of liquid photoresists solved etch profile problems and that patterning of 5 micron coated resists on planarized carriers gave 50 micron features with a 20 micron depth of focus. The etch wall profiles were significantly improved for both ion milling etching and reactive ion etching. For example, profiles improved from about 7° to 21° from horizontal for ion milling etching and from about 27° to 42° from horizontal for reactive ion etching.

Higher resolution lithography on 1 micron photoresists may be used as a result of the process of the invention allowing resolutions of about 1 micron or less and preferably about 0.2 microns or less. Generally, the etch wall profiles may be increased with the process of the invention to up to about 25° from horizontal.

Further enhancements of thin film head performance may be attained by the trimming or shaping of magnetic pole tips from the air bearing surface. The planarized geography of the row and carrier assembly resulting from the method of the invention allows for use of 1 micron thick photoresists. High resolution lithography on 1 micron photoresist coatings have been used for trimming and shaping of magnetic pole tips. This is done to achieve higher areal density data storage.

In the context of the invention, a "thin film" may have any appropriate thickness for the intended end-use application, such as transducer-laden sliders which are initially formed as rows having a thickness of about 300 mm to 500 mm.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

The invention is a method for preparing the air bearing surface of a slider for etch patterning in a preferred embodiment. A first thin film is applied to a carrier. Further thin films may be applied to the carrier, each of the thin films separated by a recess. Each of the thin films may comprise a transducer-laden air bearing surface (ABS). An adhesive film is then generally applied to the ABS side of the thin films. A fluid is then deposited in the recess, fluid held in the recess by the adhesive film. The fluid may then be cured and the adhesive film removed to provide a planar surface. The ABS side of the row may then be coated with an etch mask the etch mask developed and air bearing surface patterned.

Generally the method of the invention may be used to pattern any slider used in the hard drive assembly (HDA) in computing systems common in the industry.

Figure 1:
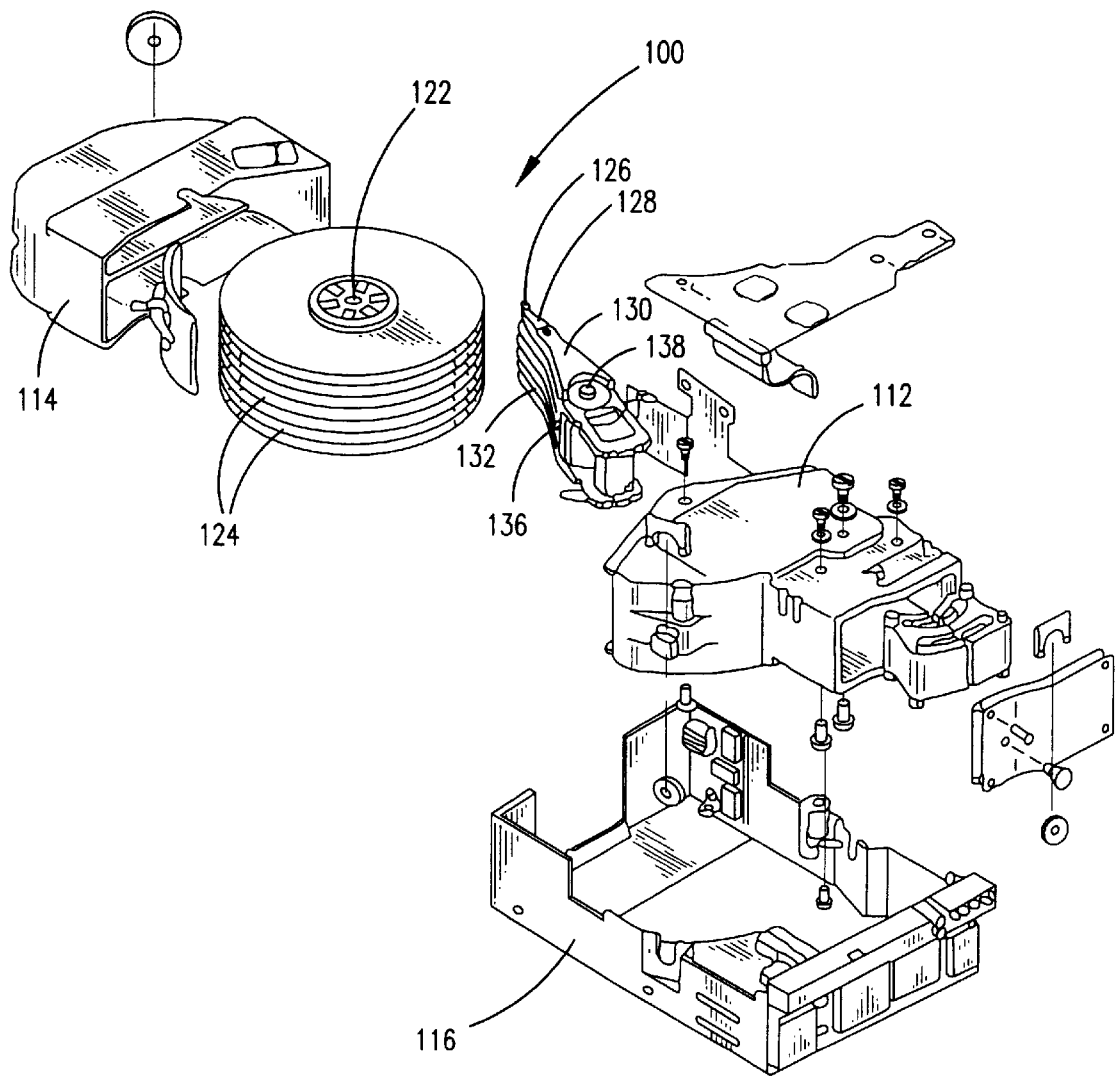
FIG. 1 is an exploded perspective view of an exemplary hard drive assembly including a slider.

As background, an exemplary HDA may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor.

Information is written on or read from the disks 124 by heads or magnetic transducers which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

Figure 2A:
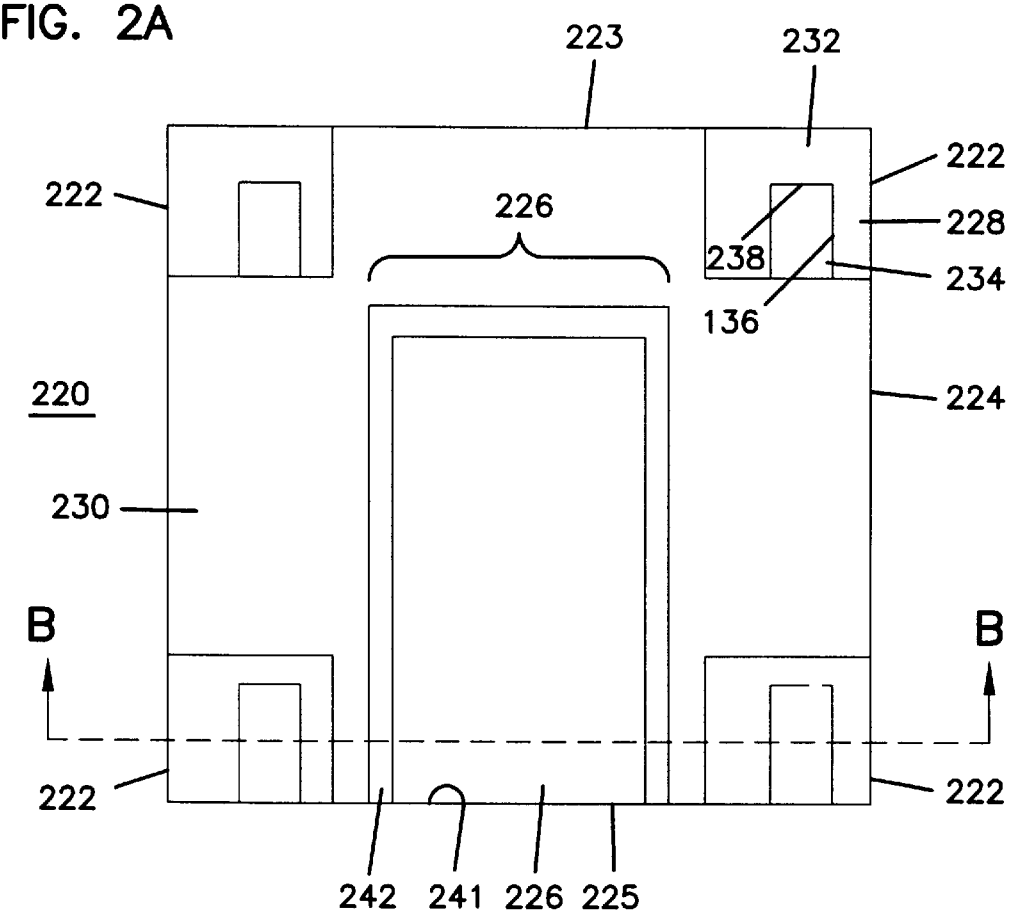
FIG. 2A is a bottom plan view of an exemplary slider.
Figure 2B:
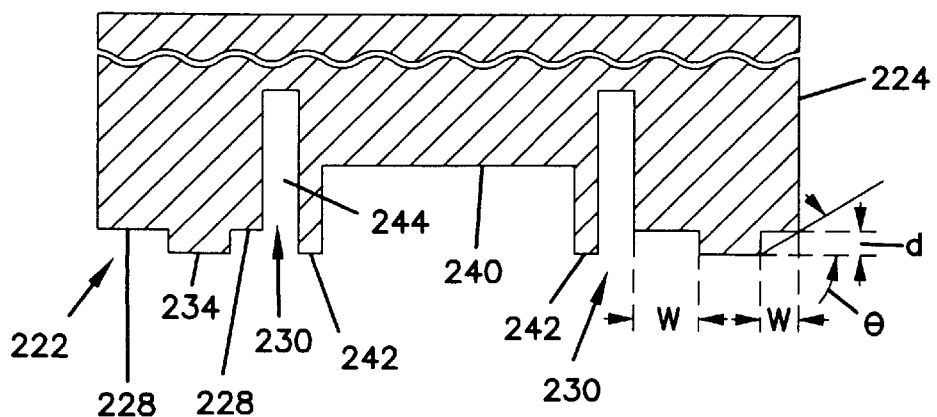
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

As can be seen, the patterning of the air bearing surface shown in FIGS. 2A and 2B can be very intricate. The processes of the invention may be used to create the patterning in the air bearing surface of this slider with reduced redeposition and finer patterning.

Processing

Figure 3:
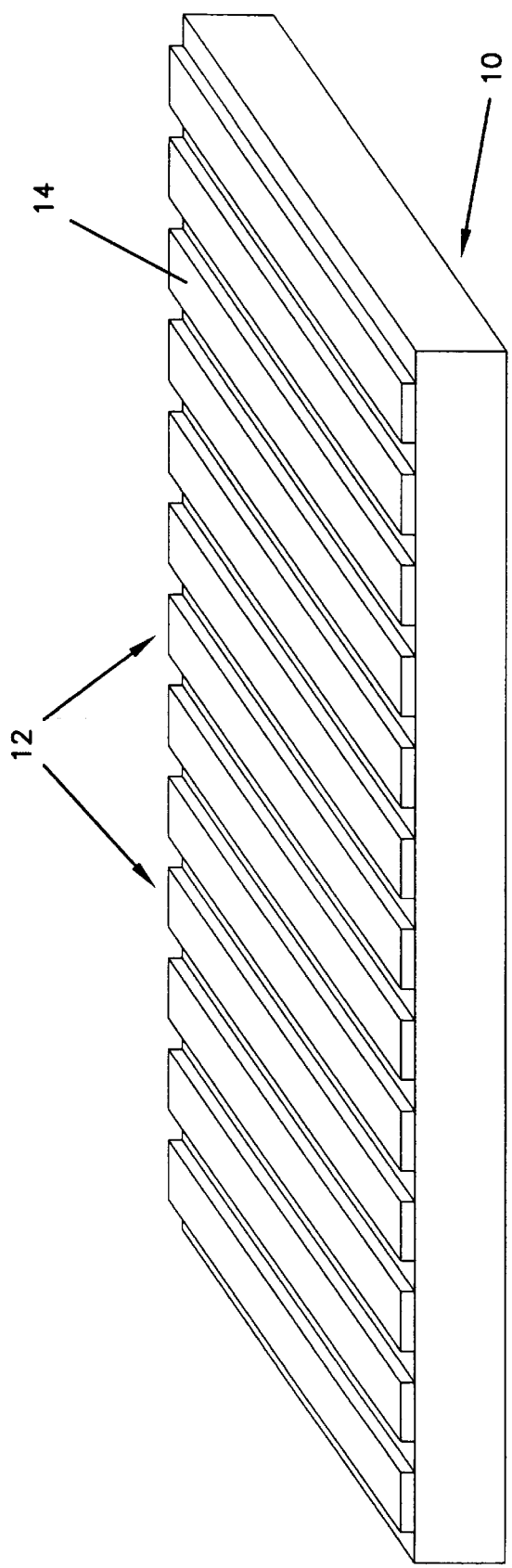
FIG. 3 is a perspective view of a row carrier having rows bonded thereto, air bearing surface side up, according to the invention.
Figure 4:
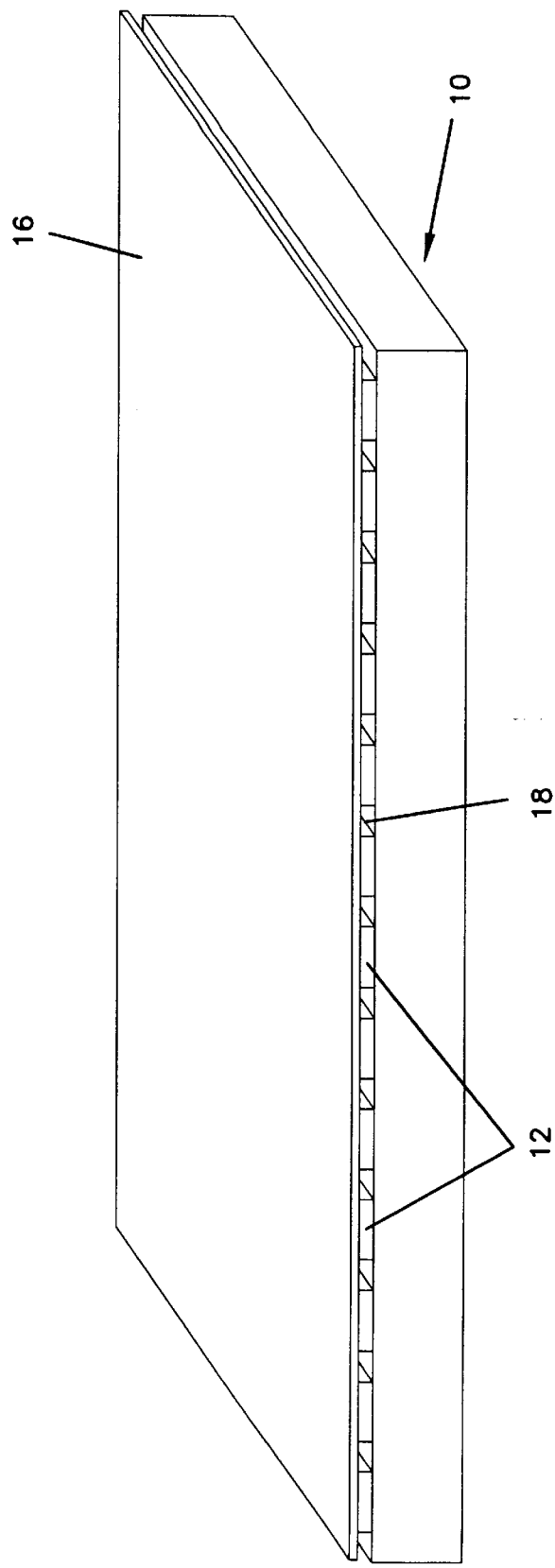
FIG. 4 is a perspective view of the row carrier depicted in FIG. 3 additionally comprising an adhesive film laminated to the ABS side of the rows.

The process of the invention may be used to pattern the exemplary air bearing surface (ABS) of the slider shown in FIGS. 2A and 2B. In accordance with the invention, a standard row carrier 10 may be used, FIG. 3. Rows 12 may be affixed to the row carrier through any means known to those of skill in the art. The distance between the rows may range from about 300 to 1000 microns and can be as small as about 100 microns or less. The means of attaching the rows includes those adhesives which are compatible with the other laminates and adhesives used in this invention. In the context of this invention, compatible means that the materials used in the invention, when in contact with each other, function independently and do not affect the function of the other material.

Generally, the rows 12 are attached with the air bearing surface (ABS) 14 side up to allow for the eventual patterning of the ABS side 14. An adhesive film 16 is then deposited over the ABS side 14 of the rows 12. The film functions to enclose the cavities or recesses 18 between the rows 12 which are raised in relationship to the recess 18. The film 16 also protects the ABS side 14 from contamination. The, film 16 may comprise any composition suitable to enclose the recesses 18 on a carrier 10 and also with stand further processing in accordance with the invention. The depth of recesses 18 depends upon the thicknesses of the thin film rows, generally about 100 to 300 microns.

The adhesive film is generally applied at temperatures ranging from about 25° C. to 30° C. and preferably about 25° C. The pressure of application may range from about 10 lbs/cm$^2$ to 50 lbs/cm$^2$ and preferably is about 25 lbs/cm$^2$.

Generally, the film comprises a laminate of an adhesive layer and a flexible substrate. Useful adhesives include pressure sensitive adhesives such as acrylics, natural rubbers, butyl rubbers, polyvinylethers, silicones, and mixtures thereof.

The flexible substrate may comprise any number of polymeric films such as those derived from monomers including ethylene, propylene, butylene and, copolymers of these olefins; vinyl monomers such as vinyl acetate, vinyl chloride, vinylidene chloride, vinyl fluoride, acrylonitrile, methyl methacrylate and mixtures thereof; of ethylene with portions of one or more unsaturated monomers such as vinyl acetate, acrylic acid and acrylic esters; as well as styrenes, carbonates, esters and urethanes.

Generally the flexible substrate comprises polyvinyl chloride, polyolefins, or polycarbonates. The thickness to the adhesive may range from about 2 to 25 microns and the flexible substrate thickness may range from about 12 to 150.

The adhesive strength of the adhesive film varies from about 50 gm/20 mm up to about 100 gm/20 mm. Commercially available adhesive films include V-8-S from Nitto Denko which is a polyvinyl chloride based tape having a 10 micron thick adhesive layer, a 70 micron thick polyvinyl chloride flexible substrate and 100 gm/20 mm of adhesion. Another film is the Nitto Denko V-8-T having the same constitution as the V-8-S film with 50 gm/mm of adhesion.

Other useful films include Nitto Denko's BT-150E-EL film having 75 gm/20 mm of adhesion a base layer of ethylene vinyl acetate which holding a 15 micron adhesive layer; Lintec's Adwill P-1600 B film which is a water flushable tape having a base material of polyolefin which is 110 microns thick, and adhesive layer of polyacrylate which in 20 microns thick, an adhesive layer of polyacrylate which is 20 microns thick and has adhesion of 140 gm/25 mm.

Figure 5:
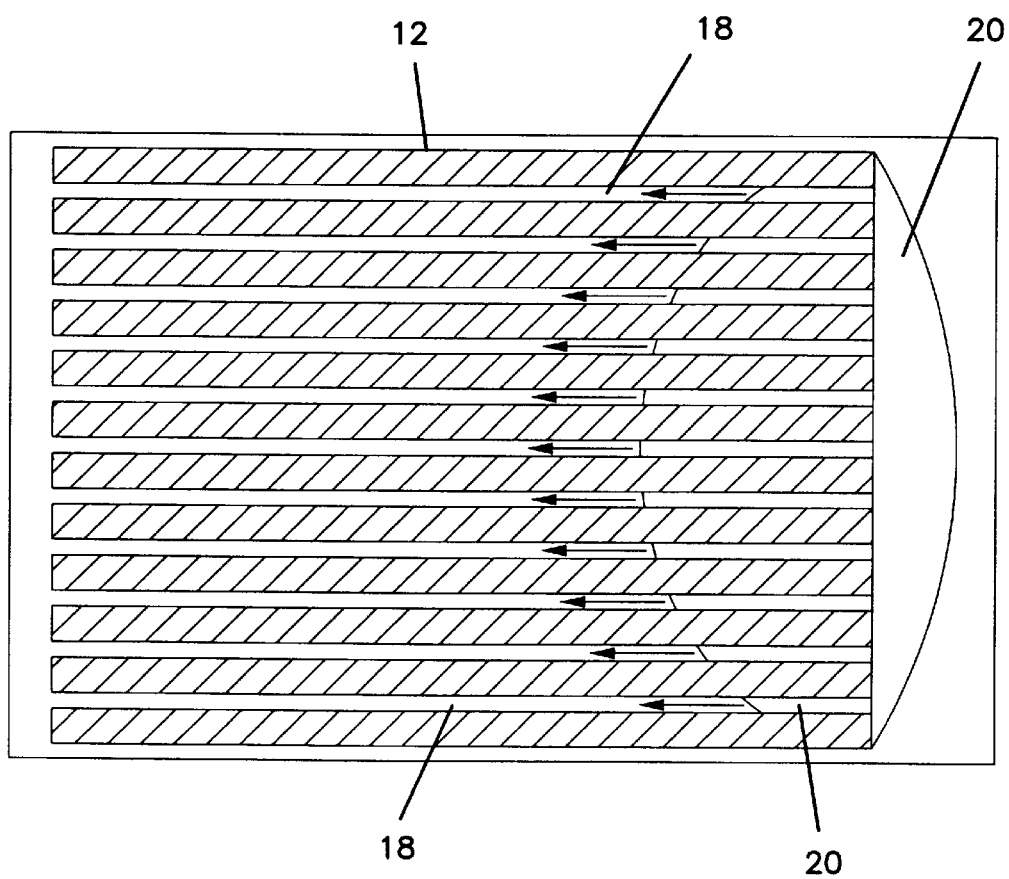
FIG. 5 is a cutaway top plan view of the row carrier depicted in FIG. 4 showing introduction of a fluid into the cavities.

Once in place a fluid 20 may be injected, or drawn into the recesses 18 between the rows 12, FIG. 5. The fluid functions to fill the recesses 18 and, once cured, planarize the rows on the carrier 10. This reduces, and can prevent, redeposition of materials onto the functional side of the rows.

Figure 6:
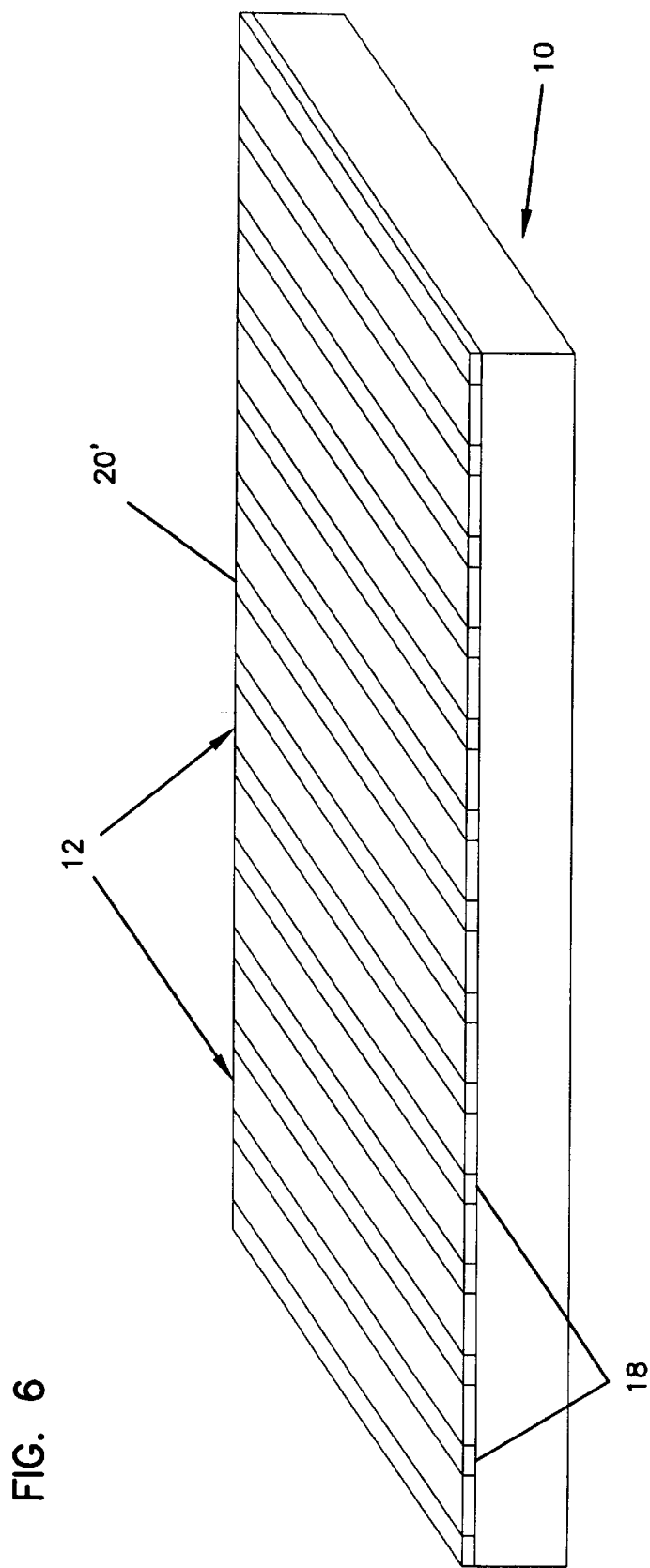
FIG. 6 is a perspective view of the row carrier depicted in FIG. 5, with the adhesion film removed.

Additionally, by bringing the level of fluid 20 to substantially the same level as the rows 12 positioned on the carrier 10, a planar landscape is formed across the surface of the carrier 10 FIG. 6. This allows for the use of thinner etch resists which, in turn, provides for creation of higher definition patterning.

Exemplary fluids are those which can be drawn into the recesses between rows to planarize the rows, cured, and then later removed. Exemplary fluids generally include a resin component and a curing agent. Resin components include those comprising monomers containing epoxy, thiol, olefin, and acrylic functionality as well as mixtures thereof.

Curable fluids commonly used include acrylic compositions, thiolene compositions, and cationically cured epoxy compositions such as those containing an epoxy oligomer, a multifunctional acrylic monomer, a cationic photoinitiator, and benzophenone.

Thiolene systems are generally those resulting from the free radical addition of a thiol to an olefin. Bifunctional monomers tend to result in a more linear polymer while polyfunctional monomers tend to provide greater crosslinking. Another useful fluid comprises unsaturated polyesters and either a sytrene or an acrylate. Also useful are curable acrylates such as those comprising polyesters, acrylics, epoxys, urethanes, polyethers, silicones and the like.

All of these systems are disclosed in "Radiation Curing of Coatings" by Senich et al in the Journal of Macronolecular Science Vol. 24, pgs. 277–289, 1984. Preferred fluids include Norland Products such as NOA81 and NBA106 which are thiol-ene, and acrylic systems, respectively.

Preferably, the fluid has a low viscosity; less than about <1000 CSt and is a mixture of acrylic monomers and photosensitizers. More preferably, the fluid has a viscosity ranging from about 100 to 1000 Cst. The fluid may be introduced by capillary action through the ends of the recesses 18 between rows 12, FIG. 5.

The fluid is then cured by exposure to ultraviolet irradiation through the adhesive film which converts the fluid to a solid encapsulating material, resistant to photoresist solvent and developers. As shown in FIG. 6, the removal of laminate gives a nearly planarized carrier 10 cured fluid 20' filled recesses 18 and rows 12, produced by a method which is done at ambient temperature and with protection of the ABS surface by the adhesive film.

After encapsulation, carrier may be masked, the etch mask developed, and the ABS side of the rows patterned. Generally any number of liquid resists may be used such as Shipley Microposit SJR 5440, Hoechst-Celanese AZ 4620 or AZ 9245 for 5 micron coating thickness and Shipley Megaposit SPR2, JSR GX210 or TOK TSMR-CR B3 for 1 micron coatings. Preferably, the viscosity of these visits range from about 20 to 1000 Cst and may be as low as about 10 Cst at 25° C.

Figure 7:
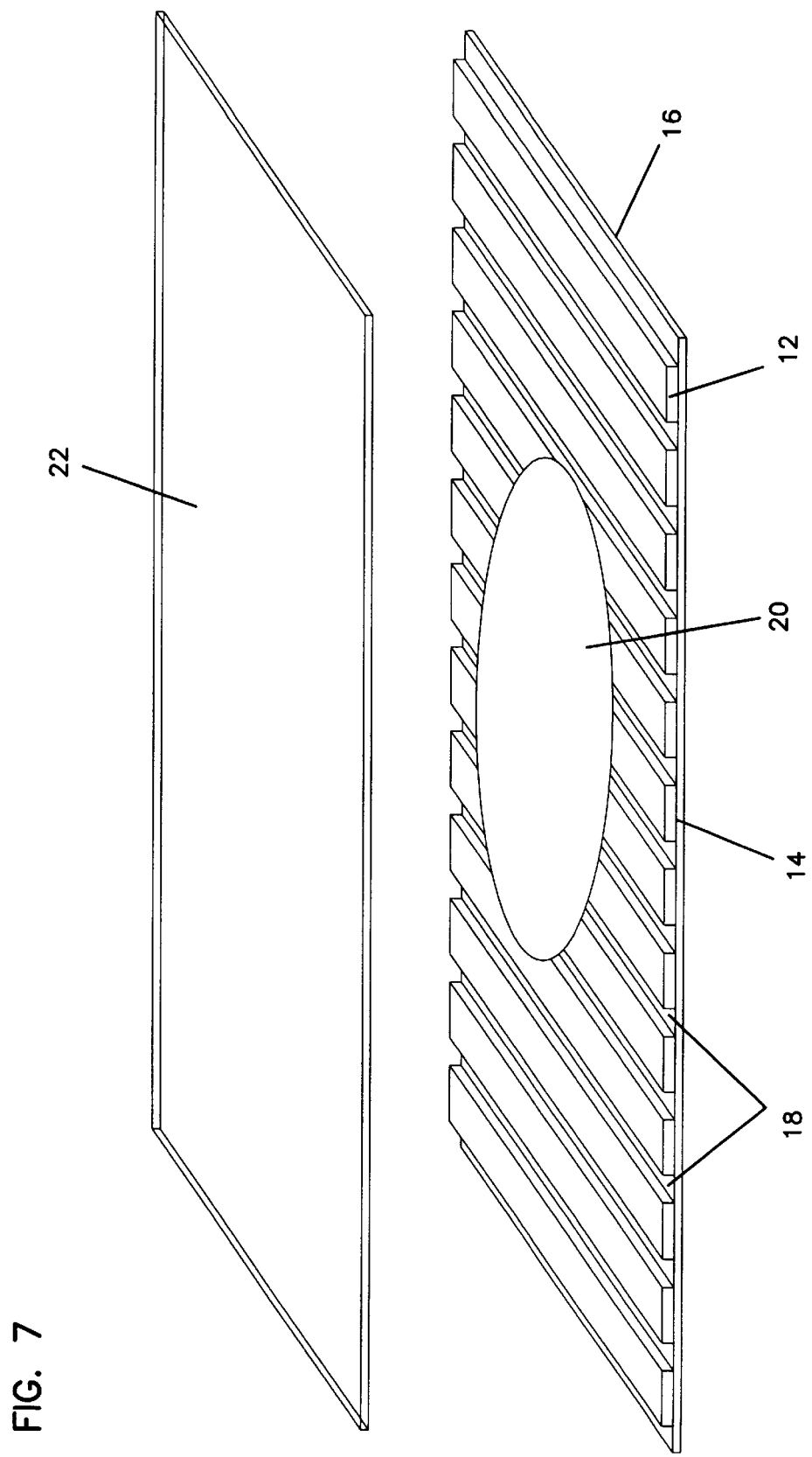
FIG. 7 is an exploded perspective view depicting an alternative embodiment of the process of the invention.

In accordance with an alternative aspect of the invention, seen in FIG. 7, the rows 12 may be placed on adhesive film 16 with the ABS side 14 down positioned adjacent film 16. The liquid encapsulating fluid 20 is dispensed on top of the rows 12 and a substrate 22 is held in contact with the rows to provide capillaries (recesses 18) for spreading the fluid 20. Following photocure, the mylar is removed and a substrate carrier (not shown) is attached to the encapsulated rows 12.

Figure 8:
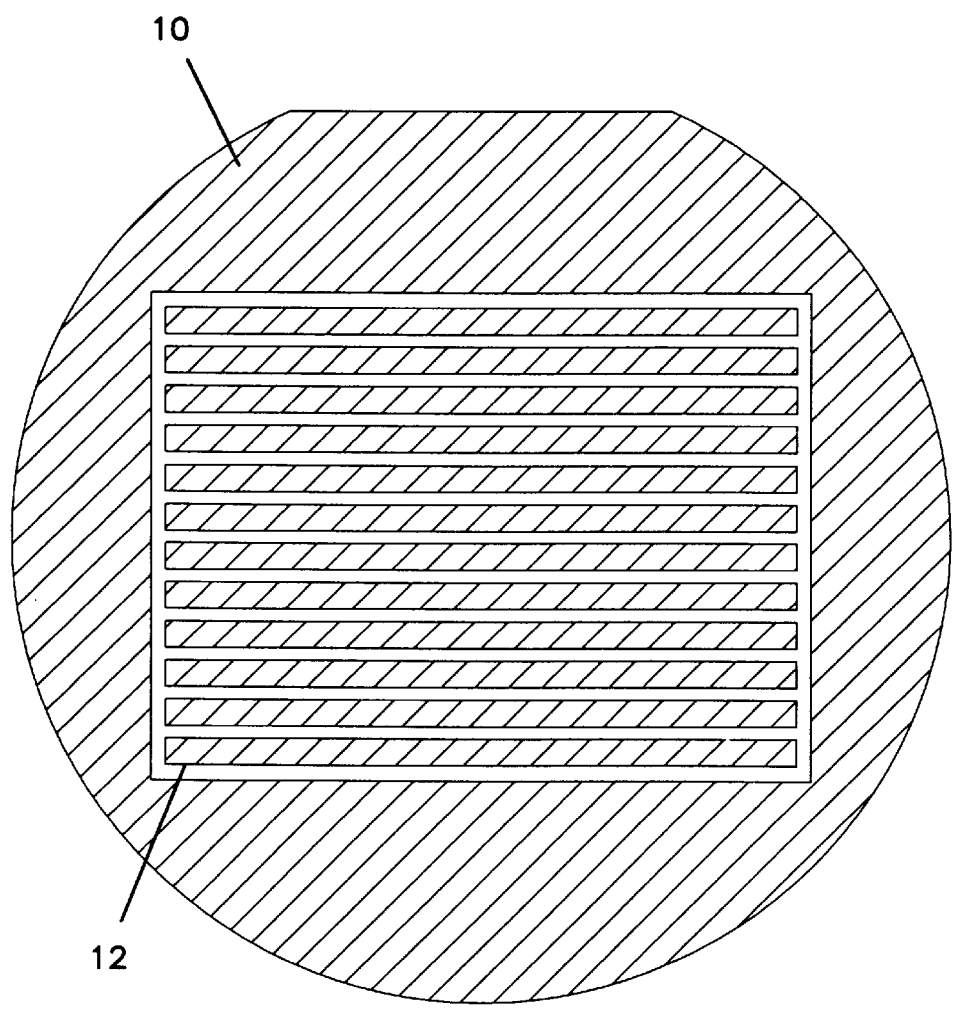
FIG. 8 is top plan view depicting a carrier in accordance with a further alternative embodiment of the invention.

A further alternative embodiment of the invention may be seen in FIG. 8. A thin carrier template 10 which contains cut-outs for one or more rows 12 may be seen. Both sides of the template are laminated and holes are cut in one face of the laminate to introduce encapsulating fluid (not shown). The fluid is then cured and one laminate is removed to provide an exposed row surface for liquid resist coating.

The processes of the invention may also be used to trim and shape magnetic pole-tips on sliders. Magnetic pole tips are the transducers which read and write information on inductive heads or write information on magnetoresistive heads. The smaller the size of the pole tip, the higher the density of information which can be written by the pole tip. The pole tip may have a top of about 1.5 to 2 microns which may be trimmed to about 1 micron or less using the method of the invention. As the magnetic storage industry attempts to make drives with continuously improving areal densities, head manufacturers are having to scale their elements to smaller dimensions. One method for reducing dimension is the trimming or shaping of magnetic pole-tips from the air-bearing surface (ABS). This process of the invention is completed at the row-level and can be accomplished by either standard lithographic techniques or focused ion beam.

Using the encapsulation procedure of the invention, row carriers assemblies have been obtained with sufficient planarization to accommodate thin, high resolution photoresist coatings. Planarized carriers have been coated with resist layers having a thickness of from about 1 to 5 microns and preferably about 1 to 1.5 microns which has both adequate thickness control and coverage at the edge of the row where the write head elements are located. This provides a resolution of about 1.5 microns to 0.1 micron, preferably about 0.5 microns to 0.1 micron, and more preferably less than about 0.2 microns.

With this process, other beneficial pole-tip manipulations are also possible. The shaping of poles can be done by using irregular shaped etch mask frames. The notching of the bottom pole can be obtained by allowing the etch frame to expose part of the bottom pole.

EXAMPLES

The following working examples provide a nonlimiting illustration of some of the advantages of the invention.

Working Example 1

A carrier containing 12 row-bars, attached with air-bearing side (ABS) up, was laminated on the ABS plane with Nitto Denko V8S tape at room temperature with 25 lbs pressure. Excess laminate was removed leaving a thin outer edge of tape on the open ends of the rows. The carrier was placed with ABS side down and Norland Optical Adhesive NOA81 was introduced along one edge of the open row 3. The liquid encapsulation fluid was pulled through the open recesses between the rows by capillary action.

When the fluid reached the end of the recesses, additional beads of NOA81 were spread on the open ends of the rows and photocured to seal the NOA81 within the recesses. The carrier was then inverted to ABS side up and exposed to broadband near UV actinic radiation through the tape. The laminated tape was removed and then the carrier was spin coated with Shipley Microposit SJR 5440 photoresist. The resist was baked to remove solvent from the film and then exposed patternwise. Development by Shipley Microposit 2401 developer diluted with 6 volumes water results in a patterned photoresist film which serves as a mask for the etch steps.

A second photolithography step was carried out for dual etch ABS designs. After the final etch step, the encapsulation material was removed by swelling the material in NMP at 40° C. followed by mechanical separation of the rows.

Working Example 2

This example was conducted in the same manner as Example 1 except Nitto Denko V8T lamination tape was used.

Working Example 3

This example was conducted in the same manner as Example 1 except Norland NBA 106 was used as the encapsulation fluid.

Working Example 4

This example was conducted in the same manner as Example 1 except a vacuum of 0.1 atm, (0.01 atm–0.8 atm being the useful range) was applied to the open end of the row to accelerate the filling of recesses by the encapsulation fluid.

Working Example 5

This example was conducted in the same manner as Example 1 except pressure was applied to the third source open to accelerate the filling of recess by encapsulation fluid.

Working Example 6

Using a carrier-row assembly prepared for patterning in accordance with the invention, lithographic imaging was carried out using the Ultratech 1700MVS exposure tool and patterns were obtained for features with dimensions at the resolution limit of the tool. With the use of a reticle containing an appropriate pole-trimming pattern, a photoresist image was obtained in which a 1.2 micrometer line was centered over the top pole. This alignment configuration was necessary for trimming the outside edges of the top pole during a subsequent ion-milling process. After final etch the top of the pole dimension was reduced from 2.5 micrometers to about 1 micrometer. The permalloy etch depth is 670 nm.

The above specification, examples and data provide a complete description of the manufacture and use of the methods and composition of the invention. Since many embodiments of the invention can be made without departing from the spirit and scope of the invention, the invention resides in the claims hereinafter appended.

The invention as is claimed is:

1. A method of processing a thin film surface to prepare said surface for etching, said thin film surface comprising at least one raised portion bordered by at least one adjacent recess, said method comprising the steps of:
   a) applying an adhesive film to said raised portion;
   b) depositing a fluid into said recess, said fluid held in said recess by said film;
   c) curing said fluid; and
   d) removing said film.

2. The method of claim 1, wherein said adhesive film comprises a laminate of an adhesive layer and a flexible substrate layer.

3. The method of claim 2, wherein said adhesive layer is pressure sensitive.

4. The method of claim 3, wherein said adhesive layer comprises and acrylate adhesive.

5. The method of claim 1, wherein said fluid is cured with actinic radiation.

6. The method of claim 2, wherein said flexible substrate layer is transparent to actinic radiation.

7. The method of claim 1, wherein said thin film surface comprises a first raised portion and a second raised portion, said first and second raised portions separated by at least one recess, said fluid deposited into said recess.

8. The method of claim 7, wherein said recess is filled with said fluid substantially to the level of said first and second raised portions.

9. The method of claim 1, wherein said fluid comprises a photosensitizer and one or more acrylate monomers.

10. The method of claim 1, wherein said fluid is selected from the group consisting of a thiol-ene composition, an acrylic composition, an epoxy composition, and mixtures thereof.

11. The method of claim 1, further comprising the steps of:
   a) coating said thin film surface with an etch mask;
   b) developing said etch mask; and
   c) etch patterning said thin film surface.

12. A patterned thin film surface resulting from the method of claim 11.

13. The method of claim 11, wherein said thin film surface comprises a transducer.

14. A patterned air bearing slider surface resulting from the method of claim 13.

15. The method of claim 11, wherein said etch mask has a thickness of from about 1 micron to 5 microns.

16. A method for preparing the air bearing surface of a slider for etch patterning, said method comprising the steps of:
   a) applying a first thin film to a carrier;
   b) applying a second thin film to said carrier, said first thin film and said second thin film separated by a recess, each of said first and second thin films comprising respective first and second air bearing surfaces;
   c) applying an adhesive film over said first and second thin films adjacent said first and second air bearing surfaces;
   d) depositing a fluid in said recess, said fluid held in said recess by said adhesive film;
   e) curing said fluid; and
   f) removing said adhesive film.

17. The method of claim 16, wherein said adhesive film comprises a laminate of an adhesive layer and a flexible substrate layer.

18. The method of claim 17, wherein said adhesive layer is pressure sensitive.

19. The method of claim 17, wherein said adhesive layer comprises an acrylate adhesive.

20. The method of claim 16, wherein said fluid is cured with actinic radiation.

21. The method of claim 17, wherein said flexible substrate layer is transparent to actinic radiation.

22. The method of claim 16, wherein said recess is filled with said fluid to the level of said respective first and second in bearing surfaces.

23. The method of claim 16, wherein said fluid comprises a photosensitizer and one or more acrylate monomers.

24. The method of claim 16, further comprising the steps of:
   a) coating said first and second air bearing surfaces with an etch mask;
   b) developing said etch mask; and
   c) patterning said first and second air bearing surfaces.

25. A patterned air bearing surface resulting from the method of claim 24.

26. The method of claim 24, wherein each of said first and second air bearing surfaces comprise one or more transducers.

27. A slider resulting from the method of claim 26.

28. The method of claim 24 wherein the etch mask has a thickness ranging from about 1 to 5 microns.

* * * * *